US007254513B2

(12) United States Patent
Lin et al.

(10) Patent No.: US 7,254,513 B2
(45) Date of Patent: *Aug. 7, 2007

(54) FAULT DETECTION AND CLASSIFICATION (FDC) SPECIFICATION MANAGEMENT APPARATUS AND METHOD THEREOF

(75) Inventors: Mu-Tsang Lin, Hemei Township, Changhua County (TW); Yi-Yu Wu, Yongkang (TW); Chia-Hung Chung, Shanhua Township, Tainan County (TW); Jian-Hong Chen, Hsinchu Hsien (TW); Chon-Hwa Chu, Taoyuan Hsien (TW); Ie-Fun Lai, Yonghe (TW); Wen-Sheng Chien, Miaoli Hsien (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 429 days.

This patent is subject to a terminal disclaimer.

(21) Appl. No.: 10/947,092

(22) Filed: Sep. 22, 2004

(65) Prior Publication Data

US 2006/0075314 A1 Apr. 6, 2006

(51) Int. Cl.
*G06F 15/00* (2006.01)
*G06F 19/00* (2006.01)

(52) U.S. Cl. ........................ 702/179; 700/108

(58) Field of Classification Search ................ 702/179, 702/182, 35; 705/7; 714/100; 257/E21.525; 700/121, 108, 51, 110

See application file for complete search history.

(56) References Cited

U.S. PATENT DOCUMENTS

| | | | |
|---|---|---|---|
| 6,263,255 B1 * | 7/2001 | Tan et al. | 700/121 |
| 6,757,621 B2 * | 6/2004 | Mizuno et al. | 702/35 |
| 6,947,801 B2 * | 9/2005 | Lin et al. | 700/108 |
| 7,117,058 B2 * | 10/2006 | Lin et al. | 700/108 |
| 7,123,980 B2 * | 10/2006 | Funk et al. | 700/121 |

FOREIGN PATENT DOCUMENTS

| | | |
|---|---|---|
| TW | 454137 | 9/2001 |
| TW | 518645 | 1/2003 |
| TW | 583406 | 4/2004 |

OTHER PUBLICATIONS

Goodlin et al., Simultaneous Fault Detection and classification for Semiconductor Manufacturing Tools, 2003, Journal of The Electrochemical Society, 150 (12), pp. G778-G784.*
Wu et al., Fault detection and Classification of Plasma CVD Tool, 2003 IEEE, pp. 123-125.*

* cited by examiner

*Primary Examiner*—John Barlow
*Assistant Examiner*—Toan M. Le
(74) *Attorney, Agent, or Firm*—Thomas, Kayden, Horstemeyer & Risley

(57) ABSTRACT

An apparatus for fault detection and classification (FDC) specification management including a storage device and a process module. The storage device stores a specification management record and a chart profile record. The specification management record stores statistical algorithm settings of a parameter and the chart profile record stores chart frame and alarm condition information. The process module, which resides in a memory, receives a manipulation message corresponding to the specification management record, and accordingly manipulates the chart profile record.

18 Claims, 9 Drawing Sheets

| Tool Type:Lam 2300 Poly | | | | | | |
|---|---|---|---|---|---|---|
| ID | Parameter | Mean | Range | STD | Max | Min |
| 1 | Gas | ✓ | | | | |
| 2 | TCP forward | | ✓ | | ✓ | |
| 3 | TCP reflected | ✓ | | | | |
| 4 | Bias forward | ✓ | ✓ | | ✓ | |
| 5 | Bias reflected | ✓ | | | | |
| 6 | Process Presssure | ✓ | | | | |
| 7 | B/S HE Presssure | ✓ | | | | |
| 8 | ESC leakage cureren | ✓ | | | ✓ | |
| 9 | ESC total voltage | ✓ | | | | ✓ |
| 10 | Bias RF voltage | ✓ | | | | |
| 11 | Backside helium flow | ✓ | | | | |
| 12 | Chiller flow | ✓ | | | | ✓ |
| 13 | ESC & chiller Temperature | ✓ | | | | |
| 14 | Chamber wall Temperature | ✓ | | | | |
| 15 | TCP C1 | | ✓ | | | |
| 16 | TCP C3 | | ✓ | | | |
| 17 | Bias series | | ✓ | | | |
| 18 | Bias shunt | | ✓ | | | |
| 19 | Throttle valve | ✓ | | | ✓ | ✓ |
| 20 | OES | ✓ | | | ✓ | ✓ |

FIG. 3a

| Tool Type:Lam 2300 Poly | | Mean |
|---|---|---|
| ID | Parameter | Goup |
| 1 | Gas | G-B |
| 2 | TCP forward | |
| 3 | TCP reflected | G-L |
| 4 | Bias forward | |
| 5 | Bias reflected | G-L |
| 6 | Process Presssure | G-R |
| 7 | B/S HE Presssure | G-L |
| 8 | ESC leakage cureren | G-L |
| 9 | ESC total voltage | G-S |
| 10 | Bias RF voltage | G-L |
| 11 | Backside helium flow | G-L |
| 12 | Chiller flow | G-DR |
| 13 | ESC & chiller Temperature | G-L |
| 14 | Chamber wall Temperature | G-T |
| 15 | TCP C1 | |
| 16 | TCP C3 | |
| 17 | Bias series | |
| 18 | Bias shunt | |
| 19 | Throttle valve | G-CH |
| 20 | OES | G-L |

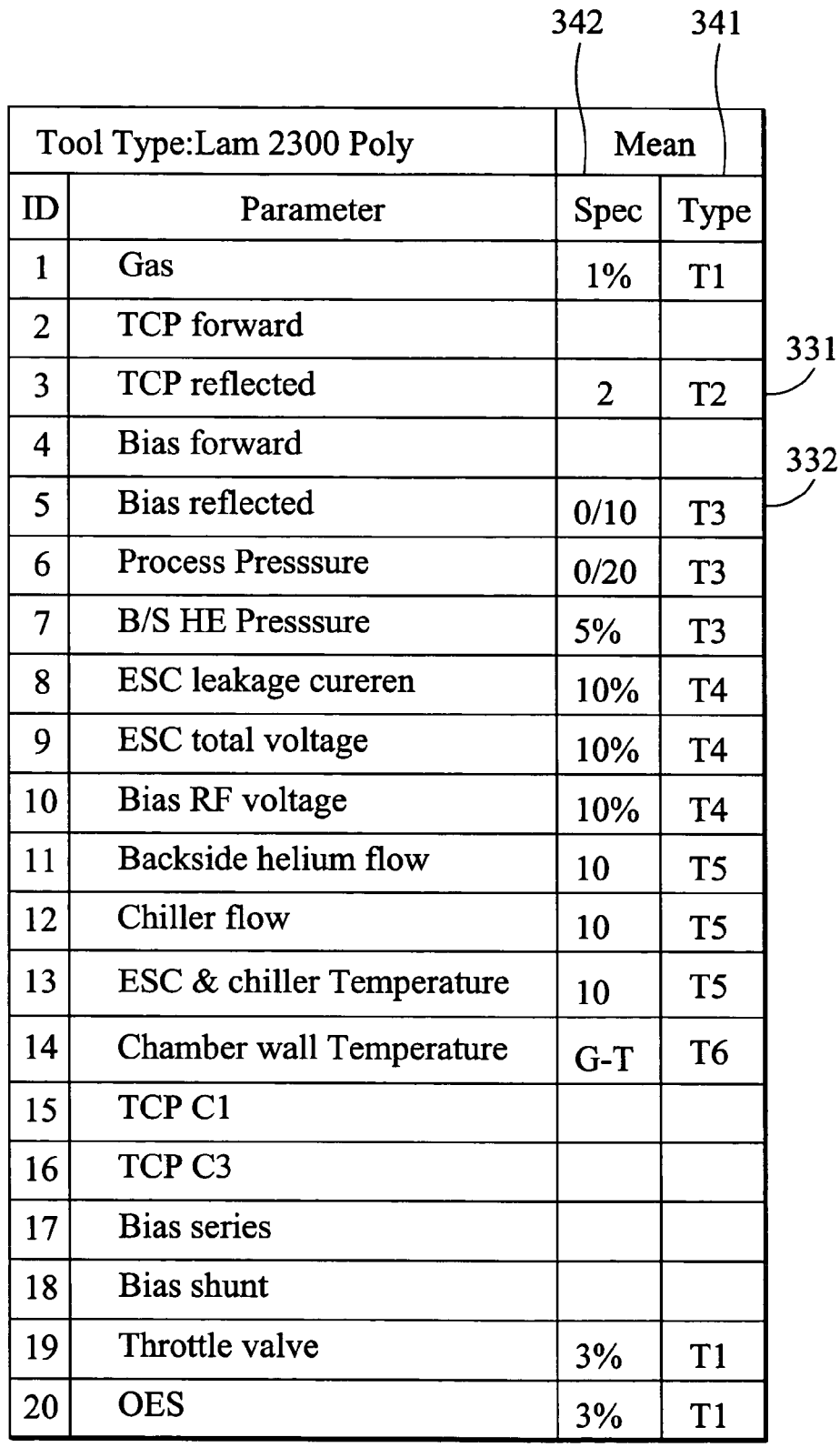

| Tool Type:Lam 2300 Poly | | Mean | |
|---|---|---|---|
| ID | Parameter | Spec | Type |
| 1 | Gas | 1% | T1 |
| 2 | TCP forward | | |
| 3 | TCP reflected | 2 | T2 |
| 4 | Bias forward | | |
| 5 | Bias reflected | 0/10 | T3 |
| 6 | Process Presssure | 0/20 | T3 |
| 7 | B/S HE Presssure | 5% | T3 |
| 8 | ESC leakage cureren | 10% | T4 |
| 9 | ESC total voltage | 10% | T4 |
| 10 | Bias RF voltage | 10% | T4 |
| 11 | Backside helium flow | 10 | T5 |
| 12 | Chiller flow | 10 | T5 |
| 13 | ESC & chiller Temperature | 10 | T5 |
| 14 | Chamber wall Temperature | G-T | T6 |
| 15 | TCP C1 | | |
| 16 | TCP C3 | | |
| 17 | Bias series | | |
| 18 | Bias shunt | | |
| 19 | Throttle valve | 3% | T1 |
| 20 | OES | 3% | T1 |

FIG. 3c

FAULT DETECTION AND CLASSIFICATION (FDC) SPECIFICATION MANAGEMENT APPARATUS AND METHOD THEREOF

BACKGROUND

The present invention relates to computer systems, and more particularly, to a method and apparatus of fault detection and classification (FDC) specification management.

Integrated circuits are typically fabricated by processing one or more wafers as a "lot" with a series of wafer fabrication tools (i.e., "processing tools"). Each processing tool typically performs a single wafer fabrication task on the wafers in a given lot. For example, a particular processing tool may perform layering, patterning and doping operations or thermal treatment. A layering operation typically adds a layer of a desired material to an exposed wafer surface. A patterning operation typically removes selected portions of one or more layers formed by layering. A doping operation typically incorporates dopants directly into the silicon through the wafer surface, to produce p-n junctions. A thermal treatment typically heats a wafer to achieve specific results (e.g., dopant drive-in or annealing).

Each processing tool typically performs a wafer fabrication task according to a predefined procedure (i.e., a predetermined set of steps or "recipe"). For example, a particular chemical vapor deposition (CVD) processing tool may perform a layering operation within a chamber according to a recipe which specifies temperatures and pressures within the chamber as a function of time, as well as the type and flow rate of gas introduced thereto.

A fault detection and classification (FDC) system directly monitors process parameters in order to detect conditions that may cause aberrations as they occur. Examples of process parameters are temperature, pressure, power and flow rates of process materials. A process parameter may be assigned to a processing tool to effectuate an outcome such as metal deposition, oxide growth, or source/drain implantation.

FDC systems collect and analyze process parameter data abnormalities, or faults, during operation of the processing tool. An example of a process fault is a significant drop in temperature from the temperature required to perform the particular process operation, e.g., thermal oxidation. Another example of a fault is a spike in a flow rate of a process material, such as helium. If a fault is detected, the system may have various means of reacting, such as notifying a tool operator or halting the process. SPC chart is a common techniques for tracking and analyzing manufacturing process variations. SPC has been applied to gauge the stability of a manufacturing process over time via charted SPC data (i.e., SPC charts) which document historical process performance.

When SPC data regarding one or more wafers processed through a given processing tool indicates a characteristic of the wafers affected by the processing tool has departed from an acceptable range established for the characteristic, an alarm is triggered, and the process is halted. In such a situation, a troubleshooting procedure is initiated to determine and rectify the cause of the alarm and return the processing tool to service as quickly as possible. Out of range characteristics are indicated on SPC charts, triggering numerous false alarms.

Conventionally, SPC charts are processed manually, requiring an operator to produce tens of thousands of SPC chart profiles containing requisite processing information, such as tool name, parameter name, chamber name, and/or others. The labor-intensive nature of SPC chart generation using conventional means severely hinders efficiency. Additionally, in order to reduce false alarms, numerous lower limits and/or upper limits in a series of SPC charts are manually modified, and such adjustment is time consuming. Thus, only a few parameters, about 5 to 10 per tool, can be optionally monitored by SPC charts in an attempt to reduce false alarms, hindering the ultimate goal of full process monitoring.

In view of these limitations, a need exists for an FDC specification management apparatus and method thereof that provides efficient SPC chart creation and maintenance functions, achieving the ultimate goal of full process monitoring.

SUMMARY

It is therefore an object of the present invention to provide an apparatus and method thereof for FDC specification management to achieve the ultimate goal of full process monitoring.

According to an embodiment of the invention, the apparatus includes a communication device, a central processing unit (CPU), a display device, an input device, a memory and a storage device.

The CPU, controlled by instructions received from the memory and from an operator through the input device, provides FDC specification management functions.

The storage device stores multiple specification management records, chart profile records and parameter statistic records. The specification management record preferably comprises seven fields: tool type, parameter identity, parameter name, statistical algorithm, statistical group, constraint type and setting value. The chart profile record and parameter statistic record employ a master-detail relationship. The chart profile record is capable of storing process information, such as a tool ID, a statistical algorithm, a parameter SVID, an upper bound value, a lower bound value or others. The parameter statistic record is capable of storing calculation results, such as statistical value, measured time or others.

The memory preferably includes a configuration module, a process module and a statistical process control (SPC) chart display module, each of which contains routines to perform FDC specification management functions.

The configuration module provides a graphical user interface (GUI) to facilitate specification management record maintenance, such as selecting a particular statistical algorithm, a statistical group, setting constraint values, or others. The GUI can also respond to information requests as required. The configuration module accordingly performs procedural operations to insert/delete/update the specification management record, such as sending a SQL query to a database system or issuing instructions to manipulate a file.

The process module coupled to the configuration module, receives a manipulation result corresponding to an updated specification management record, containing a manipulation type, operated fields and values thereof, and the result represents addition of a new statistical algorithm to a parameter, deletion of a statistical algorithm from a parameter, or updated statistical algorithm settings. According to the manipulation information, multiple new chart profile records are created if a new statistical algorithm is applied to a parameter, and conversely, multiple chart profile records are removed if a statistical algorithm is removed from a parameter. Otherwise, configuration data in corresponding chart profile records are modified if statistical algorithm settings are updated.

The SPC chart display module provides a GUI to facilitate selection and browsing thereof. The modified SPC chart is finally drawn according to the modified chart profile record and corresponding parameter statistical records. In addition to the graph, the corresponding data values are also displayed in the GUI. SPC charts are grouped into a hierarchical structure by the tool type, tool and chamber, facilitating chart selection.

BRIEF DESCRIPTION OF THE DRAWINGS

The present invention can be more fully understood by reading the subsequent detailed description and examples with references made to the accompanying drawings, wherein:

FIG. 3a is a diagram of an exemplary statistical algorithm selection screen according to the present invention;

FIG. 3b is a diagram of an exemplary statistical group selection screen according to the present invention;

FIG. 3c is a diagram of an exemplary constraint setting screen according to the present invention;

DESCRIPTION

Figure 1:
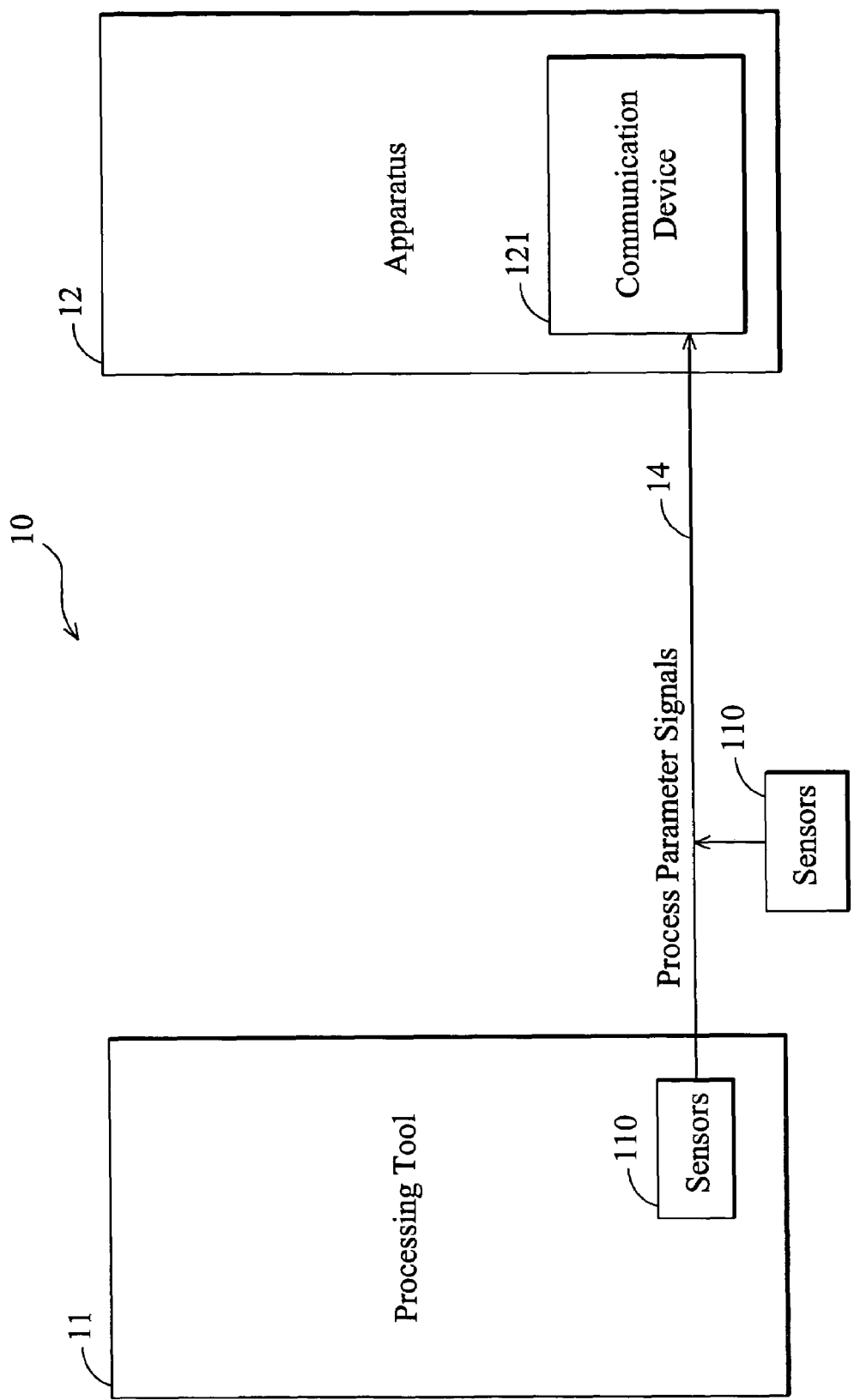
FIG. 1 is a diagram of the system architecture for a fault detection and classification (FDC) specification management according to the present invention.

FIG. 1 is a diagram of the system architecture for a fault detection and classification (FDC) specification management system according to the present invention. The system 10 includes a processing tool 11 and an apparatus 12.

The system 10 includes an apparatus 12 containing a communication device 121. The communication device 121 is configured to receive process event signals (not shown) and process parameter signals 14 from sensors 110. The sensors 110 are placed inside or outside the processing tool 11. The sensors 110 measure the process parameters of a wafer fabrication process performed by the processing tool 11. As defined herein, process parameters include temperature, pressure, flow rate, power or others, any of which can be used to configure a processing tool. The communication device 121 acquires the process parameter signals 14 on a periodic or a real time basis for statistical calculation. It is noted that the process parameter signals 14 are acquired by the communication device 121 independent of the processing tool 11. In other words, the analysis apparatus 12 is advantageously not dependent upon the processing tool 11 to provide the desired process parameters.

Figure 2:
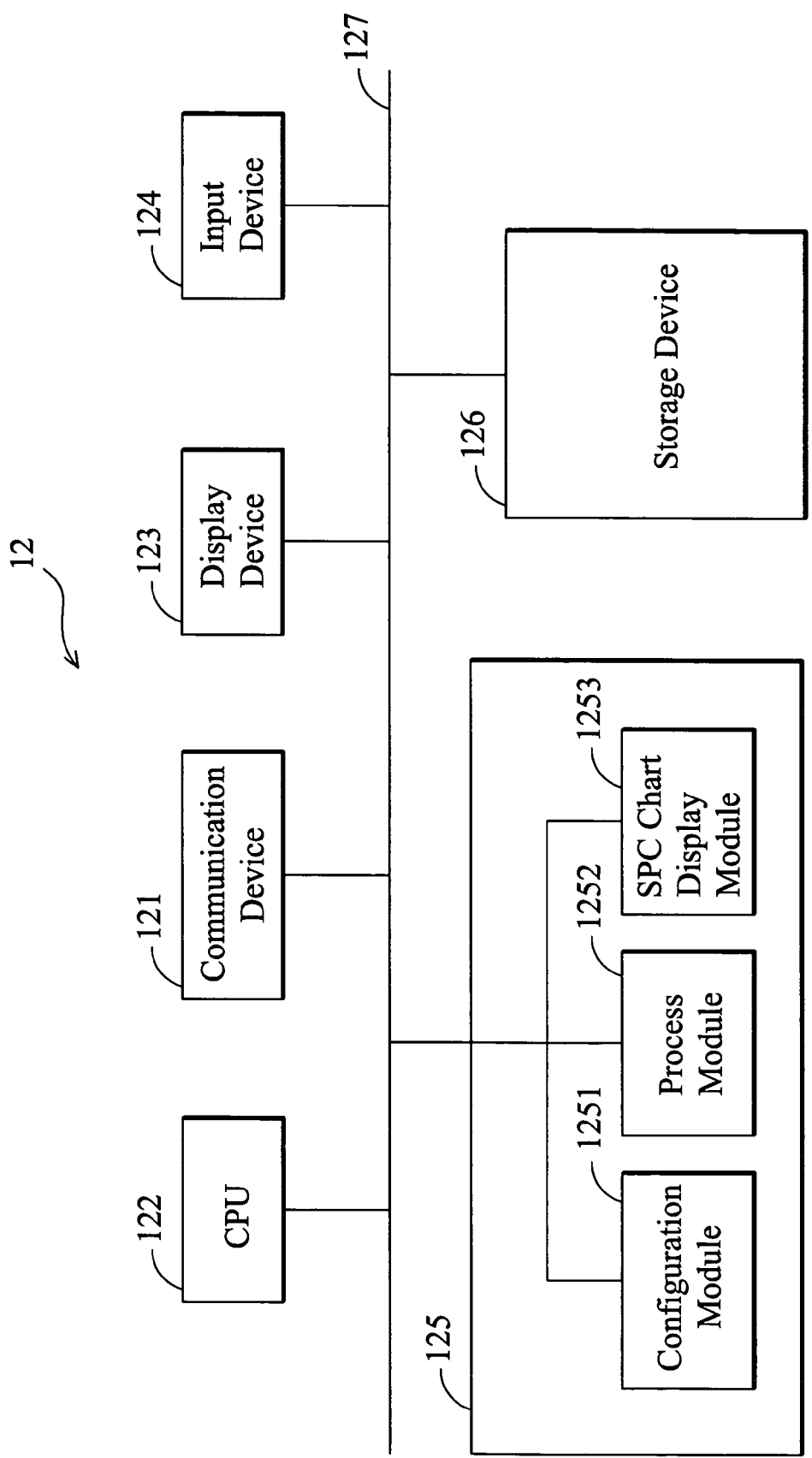
FIG. 2 is a diagram of the architecture of an apparatus of FDC specification management according to the present invention.

FIG. 2 is a diagram of the architecture of an apparatus of FDC specification management according to the present invention. The apparatus 12 includes the communication device 121, a central processing unit (CPU) 122, a display device 123, an input device 124, a memory 125 and a storage device 126. The CPU 122 is connected by buses 127 to the memory 125, the communication device 121, the display device 123, the input device 124, and the storage device 126 based on Von Neumann architecture. The CPU 122, memory 125, storage device 126, display device 123, input device 124 and communication device 121 may be conventionally incorporated in a mainframe computer, a mini-computer, a workstation computer or a personal computer.

The CPU 122, controlled by instructions received from the memory 125 and from an operator through the input device 124, performs several FDC specification management functions.

The storage device 126 can be implemented as a database system, a file system or the like, to store multiple specification management records, chart profile records and parameter statistic records.

The specification management record preferably comprises seven fields: tool type, parameter identity, parameter name, statistical algorithm, statistical group, constraint type and setting value, the tool type field being a foreign key used to store the tool type identifier, the parameter identity field being a primary key used to identify the record. Several statistical algorithms, such as mean, range, standard deviation, maximum, minimum, and the like, can be selected for a parameter. Each statistical algorithm of a specific parameter associates with a statistical group, such as "G-B", "G-R" or "G-CH", individually indicating whether the calculation is for an entire process, a processing recipe or a tool chamber. The pair of the constraint type and setting value stores constraint information indicating an acceptable range of the parameter. For example, the constraint statement "between v1 and v2" is defined in the constraint type field where v1 and v2 is set to 0 and 20 respectively in the setting value field, representing an acceptable range of parameter statistical values between 0 and 20. Consistent with the scope and spirit of the invention, additional or different fields may be provided. The implementation of the specification management record described above is not limited to a single table/file, but also to multiple related tables/files.

The chart profile record and parameter statistics record employs a master-detail relationship. The chart profile record is capable of storing process information, such as a tool ID, a statistical algorithm, a parameter SVID, an upper bound value, a lower bound value or others. The parameter statistics record is capable of storing historical performance, such as statistical values, measured time or others, associated with the processing tool, parameter SVID and statistical algorithm. The SPC chart is drawn according to the chart profile record and multiple corresponding parameter statistics records.

The memory 125 is preferably a random access memory (RAM), but may also include read-only memory (ROM) or flash ROM. The memory 125 preferably includes a configuration module 1251, a process module 1252 and a statistical process control (SPC) chart display module 1253, and each contains routines to perform FDC specification management functions.

The configuration module 1251 provides a graphical user interface (GUI), facilitating the maintenance of specification management records, such as selecting a particular statistical algorithm, a statistical group, setting constraint values, or others. The GUI can also provide additional responses to information requests as required. The configuration module 1251 accordingly performs procedural operations to insert/delete/update the specification management records, such as sending a SQL query to a database system or issuing instructions to manipulate a file.

FIG. 3a is a diagram of an exemplary statistical algorithm selection screen according to the present invention. Multiple statistical algorithms for each parameter are selected via the GUI by the configuration module 1251. According to the example, twenty parameters, ranging from 1 to 20, are provided by processing tools corresponding to the tool type "Lam 2300 Poly" 31. Referring to row 311, mean statistics is selected to calculate the "Gas" parameter data samples.

Figure 4:
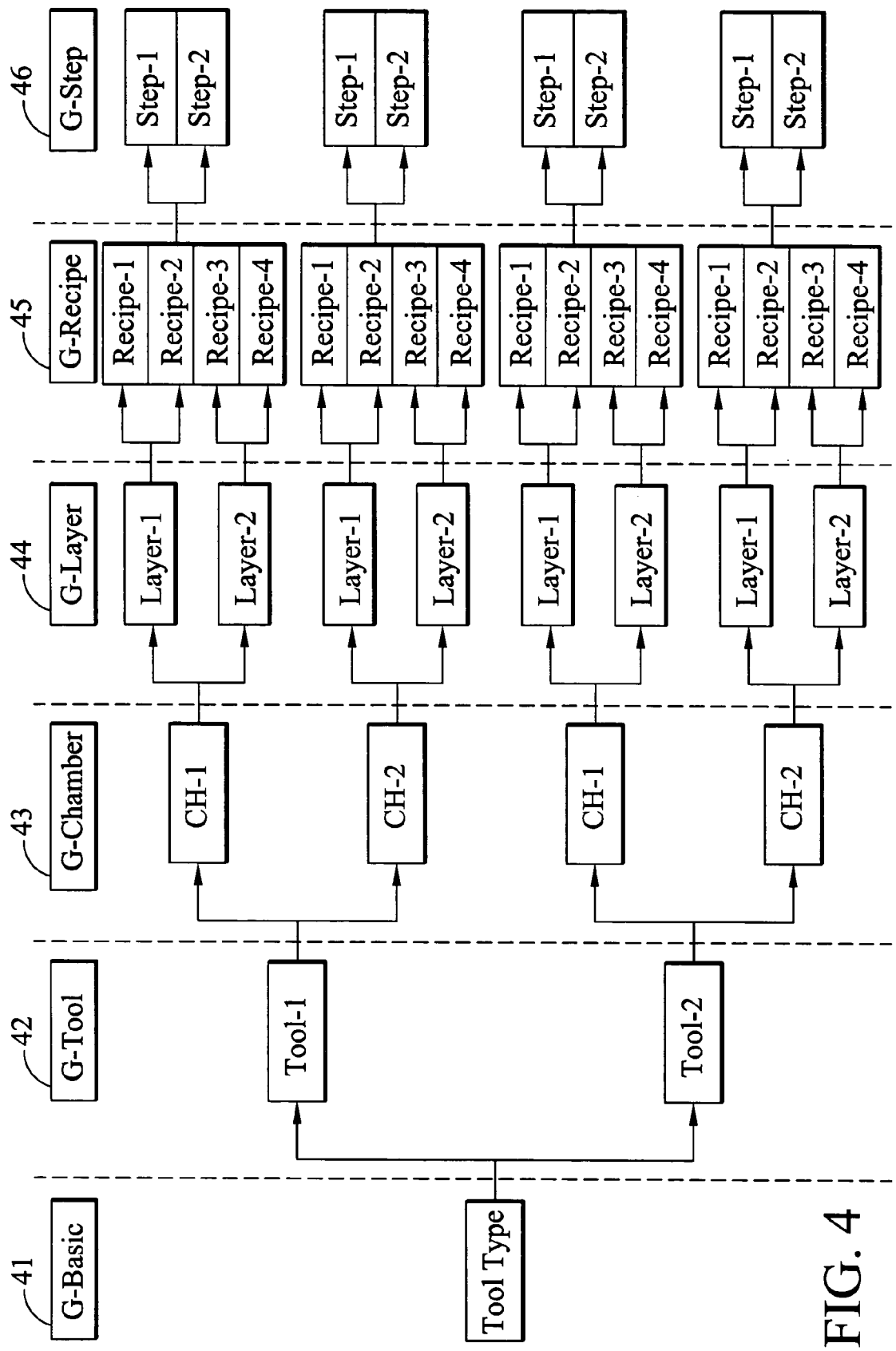
FIG. 4 is a diagram of an exemplary statistical group according to the present invention.

FIG. 4 is a diagram of an exemplary statistical group according to the present invention. According to the example, the statistical group includes six types, "G-Basic" 41, "G-Tool" 42, "G-Chamber" 43, "G-Layer" 44, "G-Recipe" 45 and "G-Step" 46, individually indicating whether the calculation is for an entire process, a processing tool, a tool chamber, a processing layer, a processing recipe or a recipe step. Consistent with the scope and spirit of the invention, additional or different groups may be provided.

FIG. 3b is a diagram of an exemplary statistical group selection screen according to the present invention. A statistical group is assigned for each statistical algorithm of the parameter via the GUI in the configuration module 1251. According to the example, referring to row 321, the statistical group of mean statistics of the "Gas" parameter is assigned to the "G-B" group; in addition, referring to row 322, the assignment of the "TCP forward" parameter is absent because the mean statistics performing the statistics calculation (referred to as FIG. 3a) has not been selected.

FIG. 3c is a diagram of an exemplary constraint setting screen according to the present invention. A constraint type with at least one setting value (i.e., specification) is defined for each statistical algorithm of the parameter through the GUI, thereby depicting an acceptable range for SPC charts. Referring to row 331, constraint type "T2", representing "acceptable range=85+−v1", is defined in the type column 341, and v1=2 is set in the specification column 342, thus, the acceptable range of mean statistical values of the "TCP reflected" parameter is between 83 and 87. Additionally referring to row 332, while the constraint type "T3" represents "acceptable range is between v1 and v2", the acceptable range of mean statistical values of the "Bias reflected" parameter is between 0 and 10.

The process module 1252 coupled to the configuration module 1251, receives a manipulation message indicating that a new statistical algorithm has been applied to a parameter, a statistical algorithm has been removed from a parameter, or settings of a statistical algorithm have been updated. According to the manipulation message, relevant chart profile records are newly created when a new statistical algorithm is applied to a parameter, and relevant chart profile records and parameter statistics records are removed when a statistical algorithm is removed from a parameter. Otherwise, configuration data in relevant chart profile records is modified when statistical algorithm settings are updated.

Figure 5:
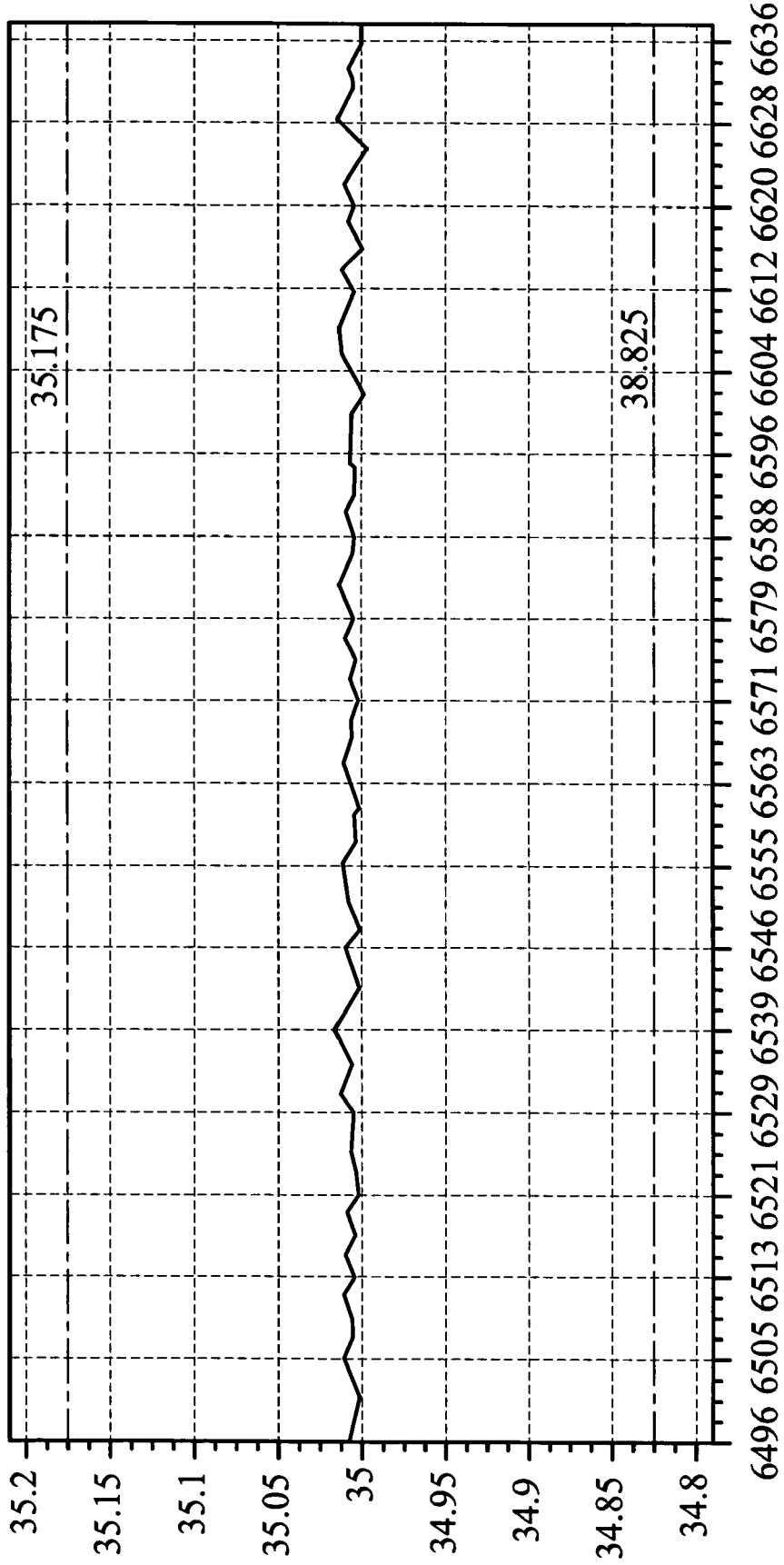
FIG. 5 is a diagram of an exemplary statistical SPC chart according to the invention.

FIG. 5 is a diagram of an exemplary statistical SPC chart according to the invention. According to the example, the two-dimensional (2D) SPC chart of mean statistics regarding the measured parameter, current pressure, of at least one semiconductor wafer processed through the particular processing tool, "NEVIT6", versus time. The SPC chart shows the upper and lower limit of the acceptable range as 34.825 and 35.175. The lower limit and upper limit correspond to a chart profile record, and each calculated point is depicted according to parameter statistics records.

The SPC chart display module 1253 provides a GUI, facilitating selection and browsing thereof. The modified SPC chart is finally drawn according to the updated chart profile record and parameter statistics records. The GUI provides a tree view containing multiple SPC chart groups enabling an operator to browse and select specific SPC charts. In addition the graphs, raw data is also displayed via the GUI.

Figure 6:
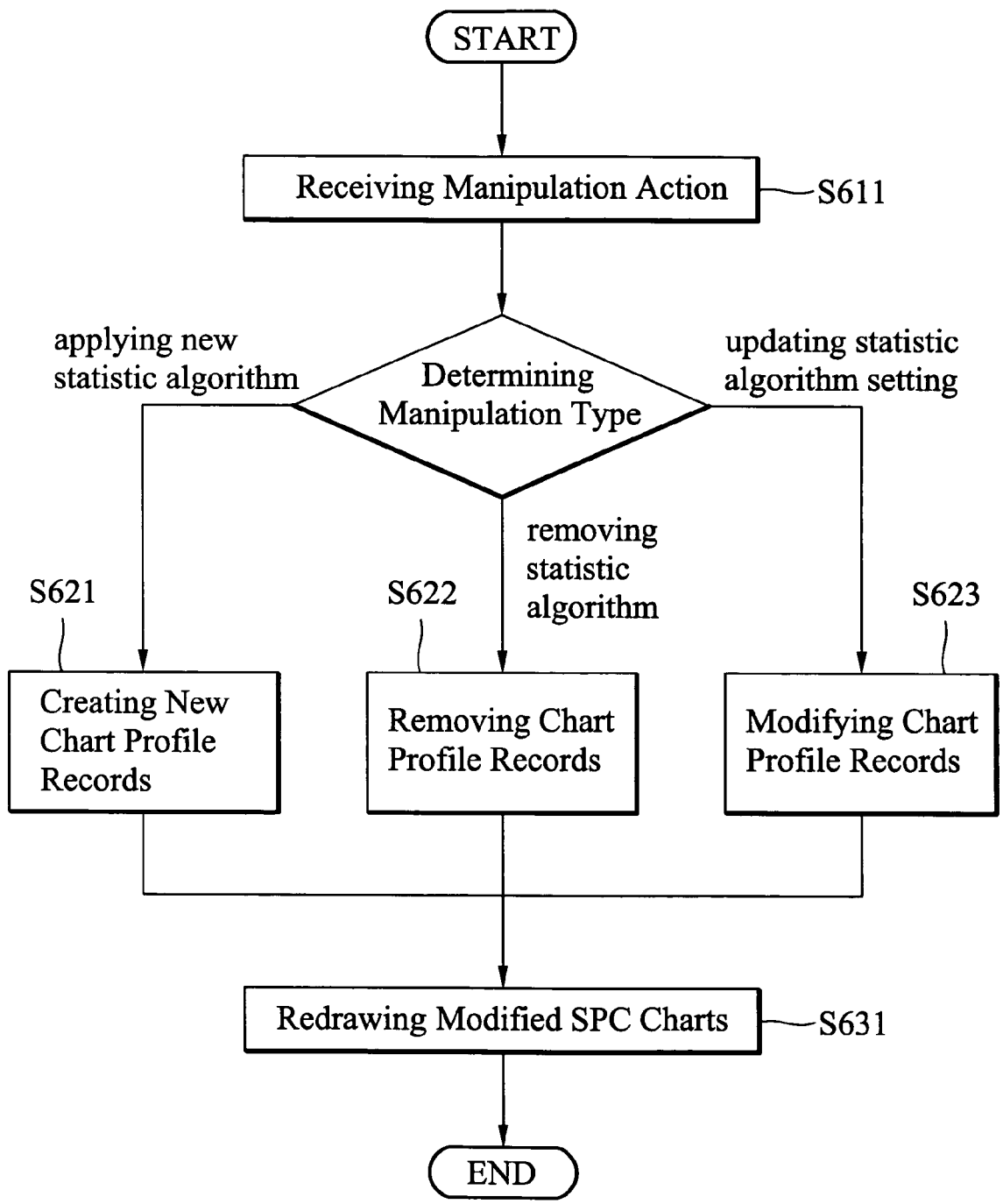
FIG. 6 is a flowchart illustrating the method of FDC specification management according to the present invention.

FIG. 6 is a flowchart showing the method of FDC specification management according to the present invention. The method begins in step S611 to receive a manipulation message indicating that a new statistical algorithm has been applied to a parameter, a statistical algorithm has been removed from a parameter, or settings of a statistical algorithm have been updated.

Next, the manipulation type is determined in step S612. If a new statistical algorithm is applied to a parameter, the process proceeds to step S621 to create new chart profile records. If a statistical algorithm is removed from a parameter, relevant chart profile records are removed in step S622. If statistical algorithm settings are updated, configuration data in relevant chart profile records are modified in step S623. In step S631, a modified SPC chart is finally drawn according to the updated chart profile record and parameter statistics records.

Figure 7:
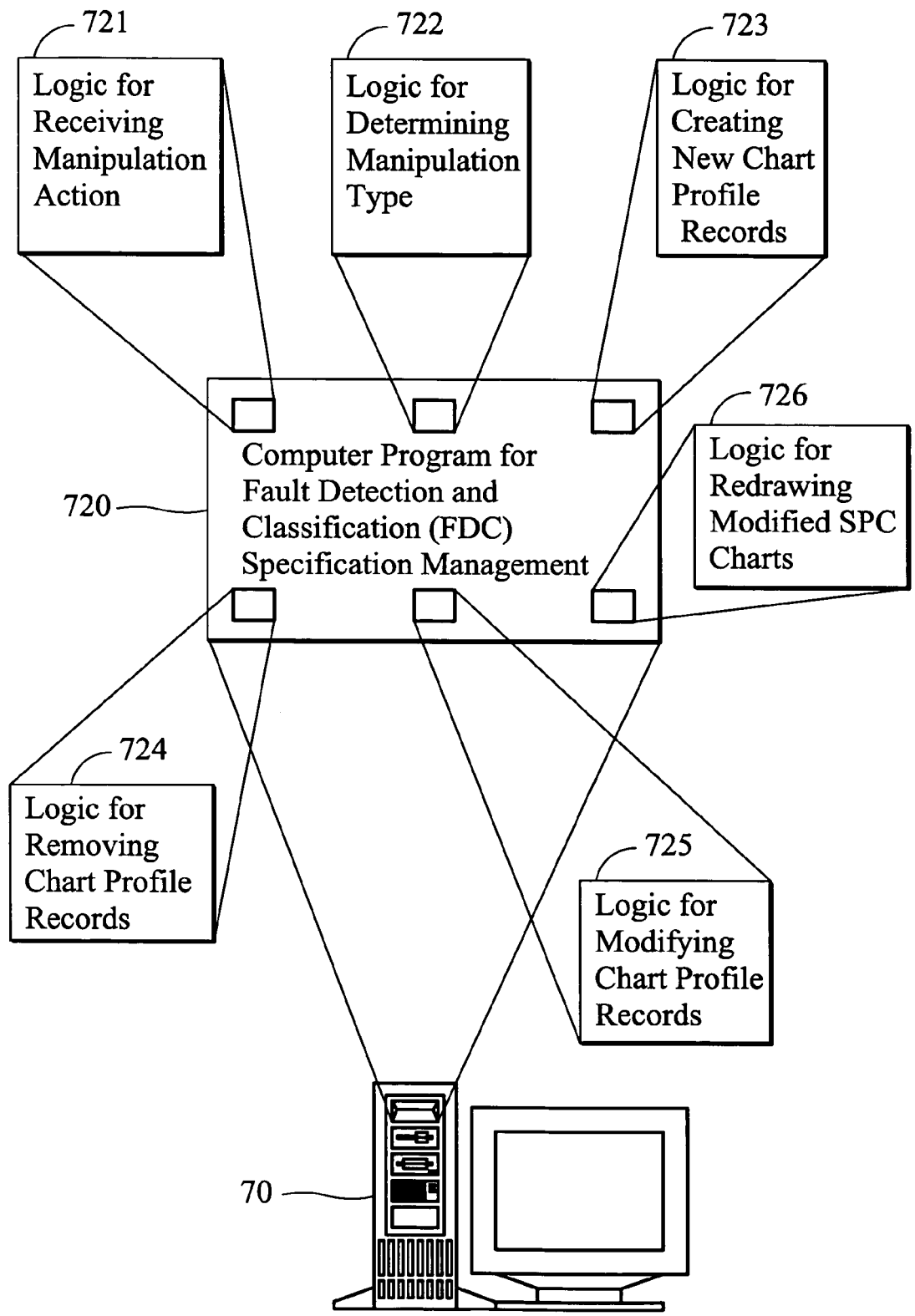
FIG. 7 is a diagram of a storage medium for storing a computer program providing the method of FDC specification management according to the invention.

The invention additionally discloses a storage medium for storing a computer program providing the disclosed method of FDC specification management, as shown in FIG. 7. The computer program product includes a storage medium 70 having computer readable program code embodied in the medium for use in a computer system, the computer readable program code comprising at least computer readable program code 721 receiving a manipulation message, computer readable program code 722 determining a manipulation type from the manipulation message, computer readable program code 723 creating new chart profile records if a new statistical algorithm is applied to a parameter, computer readable program code 724 removing relevant chart profile records if a statistical algorithm is removed to a parameter, computer readable program code 725 modifying relevant chart profile records if statistical algorithm settings are updated, computer readable program code 726 drawing a SPC chart according to the chart profile record and parameter statistics record.

The methods and system of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. An apparatus of fault detection and classification (FDC) specification management, comprising:
   a storage device capable of storing a specification management record and a chart profile record, the specification management record storing a statistical algorithm setting of a statistical algorithm for a parameter, and the chart profile record storing chart frame, a lower bound value and an upper bound value for the parameter applying the statistical algiorithm setting of the statistical algiorithm, the lower and upper bound values describing an acceptable range of the parameter; and
   a process module receiving a manipulation message, determining whether the manipulation message indicates that the specification management record is revised to apply a new statistical algorithm to the parameter, remove the statistical algorithm from the parameter, or update the statistical algorithm setting of the statistical algorithm, creating a new chart profile record comprising a new chart frame, a new lower bound value and a new upper bound value for the parameter applying the new statistical algorithm when determining the manipulation message indicates that the specification management record is revised to apply the new statistical algorithm to the parameter, removing the chart profile record when determining that the manipulation message indicates that the specification management record is revised to remove the statistical algorithm from the parameter, modifying the chart frame, and lower and upper bound values of the chart profile record in response to the updated statistical algorithm setting of the statistical algorithm when determining that the manipulation message indicates that the specification management record is revised to update the statistical algorithm setting of the statistical algorithm, and generating a new statistical process control chart (SPC) or an updated SPC chart with reference to the newly generated or updated chart profile record for tracking and analyzing manufacturing variations of the parameter.

2. The apparatus of claim 1 further comprising a configuration module providing a graphical user interface (GUI) to manipulate the specification management record.

3. The apparatus of claim 1 further comprising the SPC chart display module drawing the new SPC chart illustrating the new chart frame, and the new lower and upper bound values for the parameter applying the new statistical algorithm when determining the manipulation message indicates that the specification management record is revised to apply the new statistical algorithm to the parameter.

4. The apparatus of claim 3 wherein the SPC chart display module comprises a graphical user interface (GUI) utilized to select the newly generated SPC chart.

5. The apparatus of claim 1 further comprising a SPC chart display module drawing the updated SPC chart illustrating the updated chart frame, and lower and upper bound values of the updated chart profile record when determining that the manipulation message indicates that the specification management record is revised to update the statistical algorithm setting of the statistical algorithm.

6. The apparatus of claim 5 wherein the SPC chart display module comprises a second graphical user interface (GUI) utilized to select the updated SPC chart.

7. A method of fault detection and classification (FDC) specification management, the method comprising using a computer to perform the steps of:
   receiving a manipulation message corresponding to a specification management record, the specification management record storing statistical algorithm settings of a statistical algorithm for a parameter;
   providing a chart profile record storing chart frame, a lower bound value and an upper bound value for the parameter applying the statistical algorithm setting of the statistical algorithm, the lower and upper bound values describing an acceptable range of the parameter;
   determining whether the manipulation message indicates that the specification management record is revised to apply a new statistical algorithm to the parameter, remove the statistical algorithm from the parameter, or update the statistical algorithm setting of the statistical algorithm;
   creating a new chart profile record comprising a new chart frame, a new lower bound value and a new upper bound value for the parameter applying the new statistical algorithm when determining the manipulation message indicates that the specification management record is revised to apply the new statistical algorithm to the parameter;
   removing the chart profile record when determining that the manipulation message indicates that the specification management record is revised to remove the statistical algorithm from the parameter;
   modifying the chart frame, and lower and upper bound values of the chart profile record in response to the updated statistical algorithm setting of the statistical algorithm when determining that the manipulation message indicates that the specification management record is revised to update the statistical algorithm setting of the statistical algorithm; and
   generating a new statistical process control chart (SPC) or an updated SPC chart with reference to the newly generated or updated chart profile record for tracking and analyzing manufacturing variations of the parameter.

8. The method of claim 7 further comprising a step of manipulating the specification management record through a graphical user interface (GUI).

9. The method of claim 7 further comprising a step of drawing the new SPC chart illustrating the new chart frame, and the new lower and upper bound values for the parameter applying the new statistical algorithm when determining the manipulation message indicates that the specification management record is revised to apply the new statistical algorithm to the parameter.

10. The method of claim 9 further comprising a step of selecting the newly generated SPC chart through a graphical user interface (GUI).

11. The method of claim 7 further comprising a step of drawing the updated SPC chart illustrating the updated chart frame, and lower and upper bound values of the updated chart profile record when determining that the manipulation message indicates that the specification management record is revised to update the statistical algorithm setting of the statistical algorithm.

12. The method of claim 11 further comprising a step of selecting the updated SPC chart through a graphical user interface (GUI).

13. A machine-readable storage medium for storing a computer program which when executed performs a method of fault detection and classification (FDC) specification management, the method comprising the steps of:
   receiving a manipulation message corresponding to a specification management record, the specification management record storing statistical algorithm settings of a statistical algorithm for a parameter;

providing a chart profile record storing chart frame, a lower bound value and an upper bound value for the parameter applying the statistical algorithm setting of the statistical algorithm, the lower and upper bound values describing an acceptable range of the parameter;

determining whether the manipulation message indicates that the specification management record is revised to apply a new statistical algorithm to the parameter, remove the statistical algorithm from the parameter, or update the statistical algorithm setting of the statistical algorithm;

creating a new chart profile record comprising a new chart frame, a new lower bound value and a new upper bound value for the parameter applying the new statistical algorithm when determining the manipulation message indicates that the specification management record is revised to apply the new statistical algorithm to the parameter;

removing the chart profile record when determining that the manipulation message indicates that the specification management record is revised to remove the statistical algorithm from the parameter;

modifying the chart frame, and lower and upper bound values of the chart profile record in response to the updated statistical algorithm setting of the statistical algorithm when determining that the manipulation message indicates that the specification management record is revised to update the statistical algorithm setting of the statistical algorithm; and generating a new statistical process control chart (SPC) or an updated SPC chart with reference to the newly generated or updated chart profile record for tracking and analyzing manufacturing variations of the parameter.

14. The machine-readable storage medium of claim 13, wherein the method further comprises a step of manipulating the specification management record through graphical user interface (GUI).

15. The machine-readable storage medium of claim 13, wherein the method further comprises a step of drawing the new SPC chart illustrating the new chart frame, and the new lower and upper bound values for the parameter applying the new statistical algorithm when determining the manipulation message indicates that the specification management record is revised to apply the new statistical algorithm to the parameter.

16. The machine-readable storage medium of claim 15, wherein the method further comprises a step of selecting the newly generated SPC chart through a graphical user interface (GUI).

17. The machine-readable storage medium of claim 13, wherein the method further comprises a step of drawing the updated SPC chart illustrating the updated chart frame, and lower and upper bound values of the updated chart profile record when determining that the manipulation message indicates that the specification management record is revised to update the statistical algorithm setting of the statistical algorithm.

18. The machine-readable storage medium of claim 17, wherein the method further comprises a step of selecting the updated SPC chart through a graphical user interface (GUI).

* * * * *